United States Patent
Rong et al.

(10) Patent No.: US 8,465,712 B2
(45) Date of Patent: Jun. 18, 2013

(54) DESULFURIZATION APPARATUS AND METHOD

(75) Inventors: Charles Rong, Rockville, MD (US); Rongzhong Jiang, Olnay, MD (US); Deryn Chu, Potomac, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 355 days.

(21) Appl. No.: 12/617,197

(22) Filed: Nov. 12, 2009

(65) Prior Publication Data

US 2011/0110836 A1    May 12, 2011

(51) Int. Cl.
| | |
|---|---|
| *B01D 53/52* | (2006.01) |
| *B01D 53/82* | (2006.01) |
| *B01D 53/04* | (2006.01) |
| *B01J 8/04* | (2006.01) |
| *C01F 17/00* | (2006.01) |
| *C01F 11/02* | (2006.01) |

(52) U.S. Cl.
USPC . 423/230; 423/220; 423/244.01; 423/244.02; 423/244.06; 423/244.07; 423/263; 423/594.16

(58) Field of Classification Search
USPC .............. 423/210, 220, 230, 244.01, 244.06, 423/244.07, 263, 594.16, 635
See application file for complete search history.

(56) References Cited

U.S. PATENT DOCUMENTS

| | | | |
|---|---|---|---|
| 3,974,256 A * | 8/1976 | Wheelock et al. ............ | 423/230 |
| 4,405,443 A | 9/1983 | Bertolacini | |
| 5,326,737 A | 7/1994 | Kay et al. | |
| 5,693,588 A | 12/1997 | Poston | |
| 5,853,684 A | 12/1998 | Ming Fang | |
| 6,811,914 B2 | 11/2004 | Meixner | |
| 6,914,033 B2 | 7/2005 | Gislason et al. | |
| 7,063,732 B2 | 6/2006 | Katikaneni et al. | |
| 7,138,358 B2 | 11/2006 | Huang et al. | |
| 2010/0314297 A1 * | 12/2010 | Varadaraj et al. ............ | 208/226 |

OTHER PUBLICATIONS

"Shifting Economics of Rare Earth Materials." U.S. Dept. of Energy, Dec. 2010.*
Le Cloirec, P, et al. "Filter Configurations Used to Adsorbe Organics Onto Activated Carbon Cloth" The American Carbon Society, www.acs.omnibooksonline.com/data/papers/1997_ii124.pdf pp. 124-125.

* cited by examiner

*Primary Examiner* — Daniel C McCracken
*Assistant Examiner* — Daniel Berns
(74) *Attorney, Agent, or Firm* — Lawrence E. Anderson

(57) ABSTRACT

A method and system for desulfurization comprising first and second metal oxides; a walled enclosure having an inlet and an exhaust for the passage of gas to be treated; the first and second metal oxide being combinable with hydrogen sulfide to produce a reaction comprising a sulfide and water; the first metal oxide forming a first layer and the second metal oxide forming a second layer within the walled surroundings; the first and second layers being positioned so the first layer removes the bulk amount of the hydrogen sulfide from the treated gas prior to passage through the second layer, and the second layer removes substantially all of the remaining hydrogen sulfide from the treated gas; the first metal oxide producing a stoichiometrical capacity in excess of 500 mg sulfur/gram; the second metal oxide reacts with the hydrogen sulfide more favorably but has a stoichometrical capacity which is less than the first reactant; whereby the optimal amount by weight of the first and second metal oxides is achieved by utilizing two to three units by weight of the first metal oxide for every unit of the second metal oxide.

11 Claims, 9 Drawing Sheets
(2 of 9 Drawing Sheet(s) Filed in Color)

DESULFURIZATION APPARATUS AND METHOD

GOVERNMENT INTEREST

The invention described herein may be manufactured, used, and/or licensed by or for the United States Government.

FIELD OF THE INVENTION

This invention relates generally to desulfurization and more specifically, the invention relates to the removal of hydrogen sulfide at high temperatures.

BACKGROUND OF THE INVENTION

The military in the $21^{st}$ Century needs a more responsive, more versatile, more lethal, more survivable, and more sustainable force. This modern military force will require more electric power that is available in theater any where any time. At the same time, it is beneficial to use materials which reduce the load (by weight) that needs to be carried into the battlefield for ease of mobility and to reduce transportation requirements.

Currently the military depends on its logistics fuel, JP-8, a kerosene based jet fuel which has the highest energy density as energy source, to meet most of the power needs in battlefield. Since the fuel consumption has been increased more than ten fold over the last half century by the Army during war time, the reduction of logistics burden is in urgent need and development of advance energy conversion technology is highly desirable to meet the great power demand in today's battlefield.

Fossil fuels, such as petroleum based logistics fuel and abundant coal, usually contain sulfur impurities. Power generation processes from fossil fuels in most cases will produce some form of sulfur compounds as by-product(s). This sulfur containing by-product(s) is not only detrimental to the function of electrochemical device such as fuel cell, but is also environmentally unfriendly. Effective and efficient removal of sulfur by-product(s) from fuel stream is an essential step for any type of fossil fuel based power generation system that requires zero or near zero level of sulfur compound(s) in the consumed fuel.

One way to achieve the goal is to develop a capability to effectively and efficiently convert JP-8 to electricity so that overall fuel consumption can be reduced. Fuel cell generation of electricity in battlefield directly by JP-8 through fuel reformation is a promising technology currently under intense development. As mentioned above, sulfur impurities must be removed from the fuel stream before feeding to fuel cells and desulfurization is one of the crucial steps that may enable the advanced technology for electricity generation by hydrocarbon fuel in battlefield. Materials used in the desulfurization component require (a) a high capacity to adsorb as much as possible of hydrogen sulfide molecule per unit weight; and (b) stable and functioning at temperature as close as to the operating temperature of both the fuel reformer and the fuel cells, that is, 600 to 800° C. Zinc oxide based sorbent materials are widely used for desulfurization including hydrogen sulfide removal. Unfortunately, they are only suitable for applications at below 600° C. in reducing atmosphere such as hydrogen rich reformate and in presence of water vapor that is one of the products in the hydrocarbon fuel reformate.

JP-8 is merely an example of a type of fuel for which the present invention may be utilized. Other examples include types of fossil fuels such as diesel fuel and gasified coal.

SUMMARY OF THE INVENTION

The present invention is directed to utilizing metal oxides in a more efficient manner for the purification of gases. For example, lanthanum oxide and calcium oxide have different chemical properties with respect to the reaction with hydrogen sulfide to form lanthanum sulfide and calcium sulfide, respectively. Lanthanum metal reacts with sulfur more favorably (−141 kcal/mol for lanthanum) than calcium metal (−79.2 kcal/mol for calcium). On the other hand, lanthanum oxide has less capacity (98 mg S/g) than calcium oxide (571 mg S/g) to adsorb sulfur. An embodiment of the present invention takes advantage of the higher desulfurization capacity of calcium oxide and the more favorable sulfide formation reaction of lanthanum oxide in such a way that the overall desulfurization performance has been significantly improved than using any one of them alone, on the same weight basis. Particularly, in accordance with the principles of this invention, calcium oxide was placed to be contacted with incoming reformate gases first and in relatively large quantity for its high capacity; and lanthanum oxide was placed second in a separate, individual filtration stage so that it was contacted with the reformate gases that were already largely desulfurized by calcium oxide. The favorable sulfide formation between lanthanum oxide and hydrogen sulfide will then allow all the remaining hydrogen sulfide in the gas stream with lower level of sulfur content after calcium oxide to be reduced to basically zero level. Although in the exemplary embodiment, each of the calcium oxide and lanthanum oxide layers are separated by that enclosure 11, one of ordinary skill in the art would appreciate that the material used as the separation/support layer 13 between the bi-layers could be eliminated without departing from the principles of the present invention. Also, the space between elements 13 and 14 could be eliminated without departing from the principles of the present invention.

An exemplary use of a preferred embodiment is the generation of electricity by fuel cells with JP-8 fuel, where the hydrocarbon molecules in the fuel have to be first converted to hydrogen gas and carbon monoxide gas in a device that called fuel reformer which operates at 800° C. to 1000° C. The operating temperature of the fuel cells is optimally in a range of 600 to 800° C. for the so-called fuel reformate (a gas mixture rich in hydrogen with some amount of carbon monoxide). A desulfurization component may need be placed in between the fuel reformer and the fuel cell to clean the fuel reformate to remove sulfur impurities, specifically, hydrogen sulfide molecule.

Materials used in the desulfurization component, require (a) a high capacity to adsorb as much as possible of hydrogen sulfide molecule per unit weight; and (b) stable and functioning at temperature as close as to the operating temperature of both the fuel reformer and the fuel cells, that is, 600 to 800° C. Lanthanum oxide and calcium oxide are two high temperature hydrogen sulfide sorbents that are both stable and functioning at 600 to 800° C. In a preferred embodiment resembling that depicted in FIG. 1A, the experimental results of a bi-layer assembly of calcium oxide and lanthanum oxide was about 4 times better than lanthanum oxide or calcium oxide individually; the performance being measured by the duration time of complete removal of hydrogen sulfide from the fuel stream by the sorbent materials based on the per unit weight.

A preferred embodiment effectively adsorbs hydrogen sulfide from hydrogen rich stream in presence of water and at temperature range of 600° C. to 800° C.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention can best be understood when reading the following specification with reference to the accompanying drawings, which are incorporated in and form a part of the specification, illustrate alternate embodiments of the present invention, and together with the description, serve to explain the principles of the invention. In the drawings.

Figure 1B:
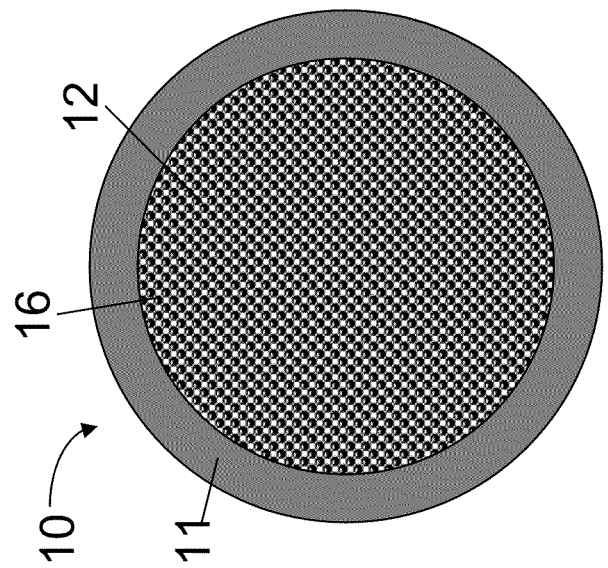
FIG. 1B is a schematic illustrating the top view of assembly 10.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DETAILED DESCRIPTION OF THE PREFERRED EMBODIMENTS

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A preferred embodiment of the present invention comprises apparatus and methodology directed to the making a combination of lanthanum oxide and calcium oxide as desulfurization sorbent assembly that results in significant increase of effective removal of hydrogen sulfide, that is, the increased duration time of complete removal of hydrogen sulfide from the fuel gas stream by the sorbent materials based on the per unit weight. In this case, hydrogen sulfide in the treated fuel gas stream remained virtually at zero parts per million (ppm) level with several hundred ppm in the incoming untreated fuel gas stream, in comparison to the case that either lanthanum oxide is used alone, or calcium oxide used alone, on the basis of the same weight of the sorbent materials applied.

As an exemplary use, a desulfurization assembly constructed in accordance with the principles of the present invention may be used in a power generation system employing fuel reformer and fuel cell to produce electricity with fossil fuels such as JP-8. The assembly serves the purpose of removing hydrogen sulfide molecule in the reformate before it is sent to the fuel cell. Two layers of sorbent materials, each of which consists of a particular metal oxide, calcium oxide and lanthanum oxide, are used in the assembly in particular order and in particular amount with each other. The desulfurization assembly may operate at 600° C. to 800° C. Because the fuel cell may be carried by a person or weight-sensitive vehicle over miles of terrain, the weight of the desulfurization assembly is optimally reduced by using a combination of calcium oxide and lanthanum oxide in predetermined ratios (by weight) in order that the overall weight is reduced while maintained an output that is substantially free of hydrogen sulfide.

Figure 1A:
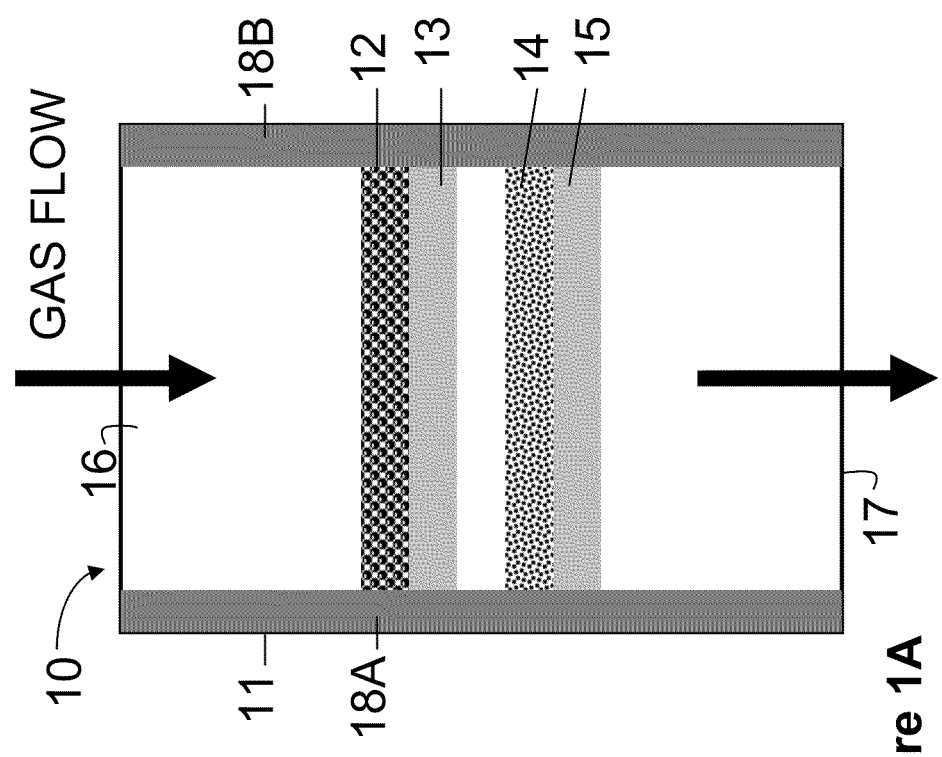
FIG. 1A is a schematic illustration of an exemplary bi-layer sorbent assembly 10.

FIG. 1A is a schematic illustration of an exemplary bi-layer sorbent assembly. Assembly 10 comprises an enclosure 11 having two layers 12, 14 of sorbent materials in the assembly and the gas flow direction, may for example, flow from the top of the assembly 10 to the bottom as shown in FIG. 1A. As used herein the terminology "enclosure" includes a partial enclosure having an inlet 16 and an outlet 17, and includes configurations such as a cylinder, vessel, chamber, container, receptacle, or pipe. The enclosure 11 may be in the form of a cylinder in which a continuous wall is formed on both the right and left sides as seen in FIG. 1B. Alternately, the enclosure may comprise first and second walls 18A and 18B. A variety of cross-sectional forms can be used to form the passage for the flow of gas, including rectangular, oval, square, triangular, etc. The first layer 12 is calcium oxide and the second layer 14 is lanthanum oxide. The first and the second may be separated by inert porous material layers 13 and 15. The calcium oxide and lanthanum oxide were positioned as shown in FIG. 1A along a common axis with the reformate gases fed successively through calcium oxide first and then lanthanum oxide next in an axial direction through the sorbent assembly vertically from the top to the bottom of the assembly, as shown in FIG. 1A. It can be readily appreciated by those of ordinary skill in the art that other filter configurations may be utilized such as a cylindrical arrangement of two layers of the oxides where the first layer 12 is used as the inner layer and the second layer 14 is as the outer layer with the gas coming into the inner cylinder and passing radially through the first inner cylindrical layer followed by passing through the second outer cylindrical layer.

The working principle is described as follows based on the fundamental properties of the two metal oxides. As used herein, the stoichiometrical capacity is the theoretical value of the amount of sulfur molecule in milligram (mg) that can be adsorbed on one gram sorbent oxide. The $\Delta H(298)$ correlates to the enthalpy value at 298K (25° C.) of a chemical reaction measured in heat released in kilo-calorie per mole of reacted molecule.

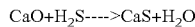   [Equation 1]

Stoichiometrical Capacity: 571 mg S/g

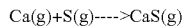   [Equation 1A]

$\Delta H(298)$: −79.2 kcal/mol

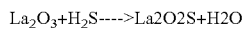   [Equation 2]

Stoichiometrical Capacity: 98 mg S/g

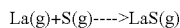   [Equation 2A]

$\Delta H(298)$: −141 kcal/mol

As seen from the above, lanthanum and calcium should have different chemical properties with respect to the reaction to form lanthanum sulfide and calcium sulfide, respectively. Based on the above known data, we expect that lanthanum oxide reacts with sulfur more favorably (−141 kcal/mol for lanthanum metal) than calcium oxide (−79.2 kcal/mol for calcium metal). On the other hand, lanthanum oxide has less capacity (98 mg S/g) than calcium oxide (571 mg S/g) to adsorb sulfur. An embodiment of the present invention takes advantage of the higher desulfurization capacity of calcium oxide and the more favorable sulfide formation reaction of lanthanum oxide in such a way that the overall desulfurization performance has been significantly improved than using any one of them alone, on the same weight basis. Particularly, in accordance with the principles of this invention, calcium oxide was placed to be contacted with reformate gases first and in relatively large quantity for its high capacity; and lanthanum oxide was placed second in a separate, individual filtration stage so that it was contacted with the reformate gases that were already largely desulfurized by calcium oxide. The favorable sulfide formation between lanthanum oxide and hydrogen sulfide will then allow all the remaining hydrogen sulfide in the gas stream with lower level of sulfur content after calcium oxide to be reduced to basically zero level. Although in the exemplary embodiment, each of the calcium oxide and lanthanum oxide layers are separated by the wall 11, one of ordinary skill in the art would appreciate that the material used as the separation/support layer 13 between the bi-layers could be eliminated without departing from the principles of the present invention. Also, the space between elements 13 and 14 could be eliminated without departing from the principles of the present invention.

Figure 2:
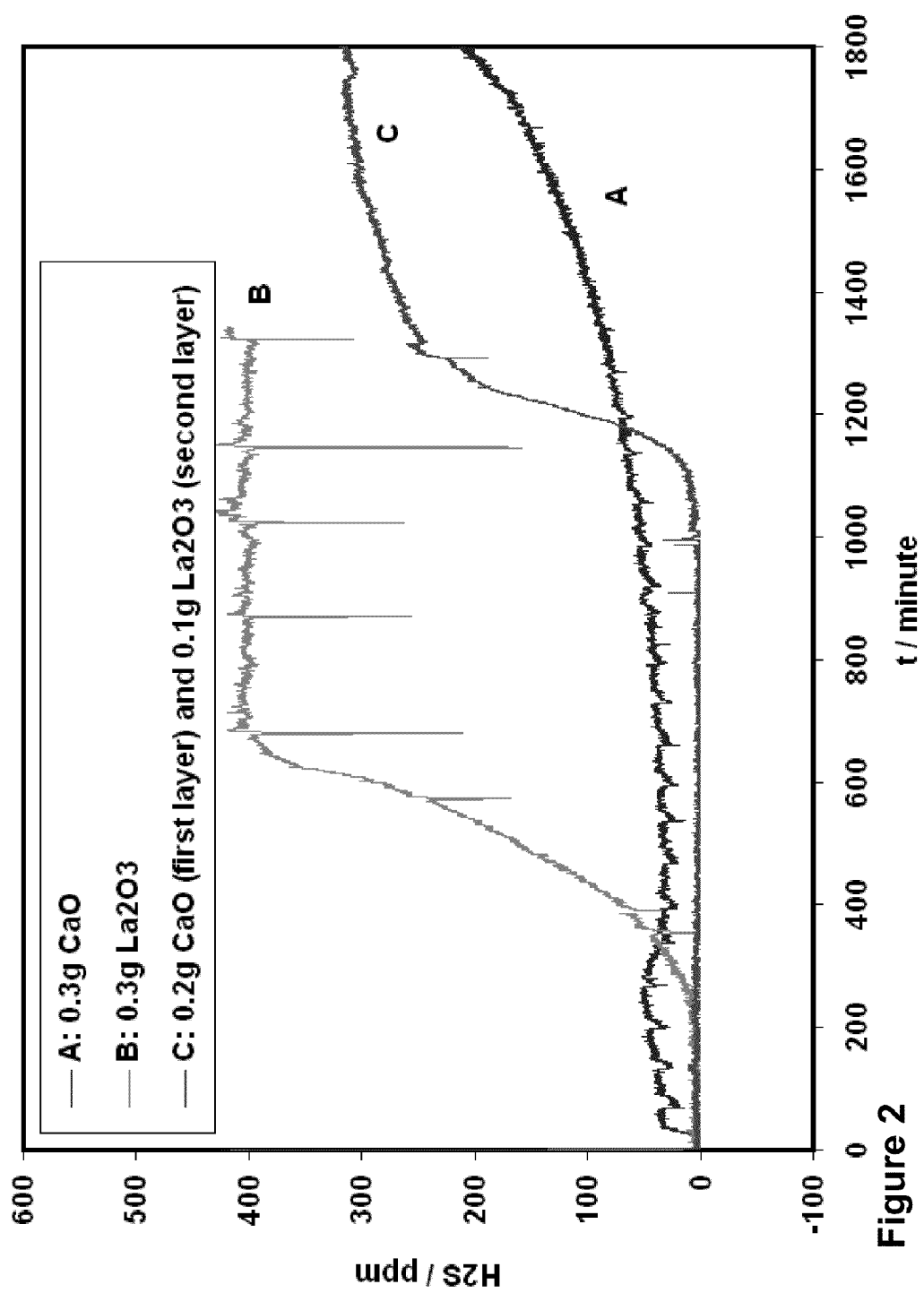
FIG. 2 graphically illustrates experimentally derived desulfurization results of CaO, $La_2O_3$, and a preferred embodiment sorbent assembly combination where incoming $H_2S$ is 420 ppm and the total amount of the sorbent material in each case is 0.3 g.

FIG. 2 graphically illustrates desulfurization results of CaO, La$_2$O$_3$, and a preferred embodiment sorbent assembly combination at 600° C. The line graph A corresponds to the results obtained using only 0.3 g CaO. The graphical line B corresponds to the results obtained using only 0.3 g La$_2$O$_3$. The graphical line C corresponds to the results obtained using 0.2 g CaO (first layer) and 0.2 g La$_2$O$_3$ (second layer) in the preferred embodiment assembly 10. Incoming gases contained approximately 420 ppm hydrogen sulfide H$_2$S and the total amount of the sorbent material in each experiment was 0.3 g.

As shown in the FIG. 2, calcium oxide alone did not reduce hydrogen sulfide from 400 ppm to near zero ppm (graphical line A), while lanthanum oxide alone only reduced hydrogen sulfide from 400 ppm to near zero ppm for the duration of about 250 minute (graphical line B). However, in the invented assembly, the duration was increased to over 1000 minute with the same total weight of 0.3 g sorbents combined (graphical line C).

Figure 3:
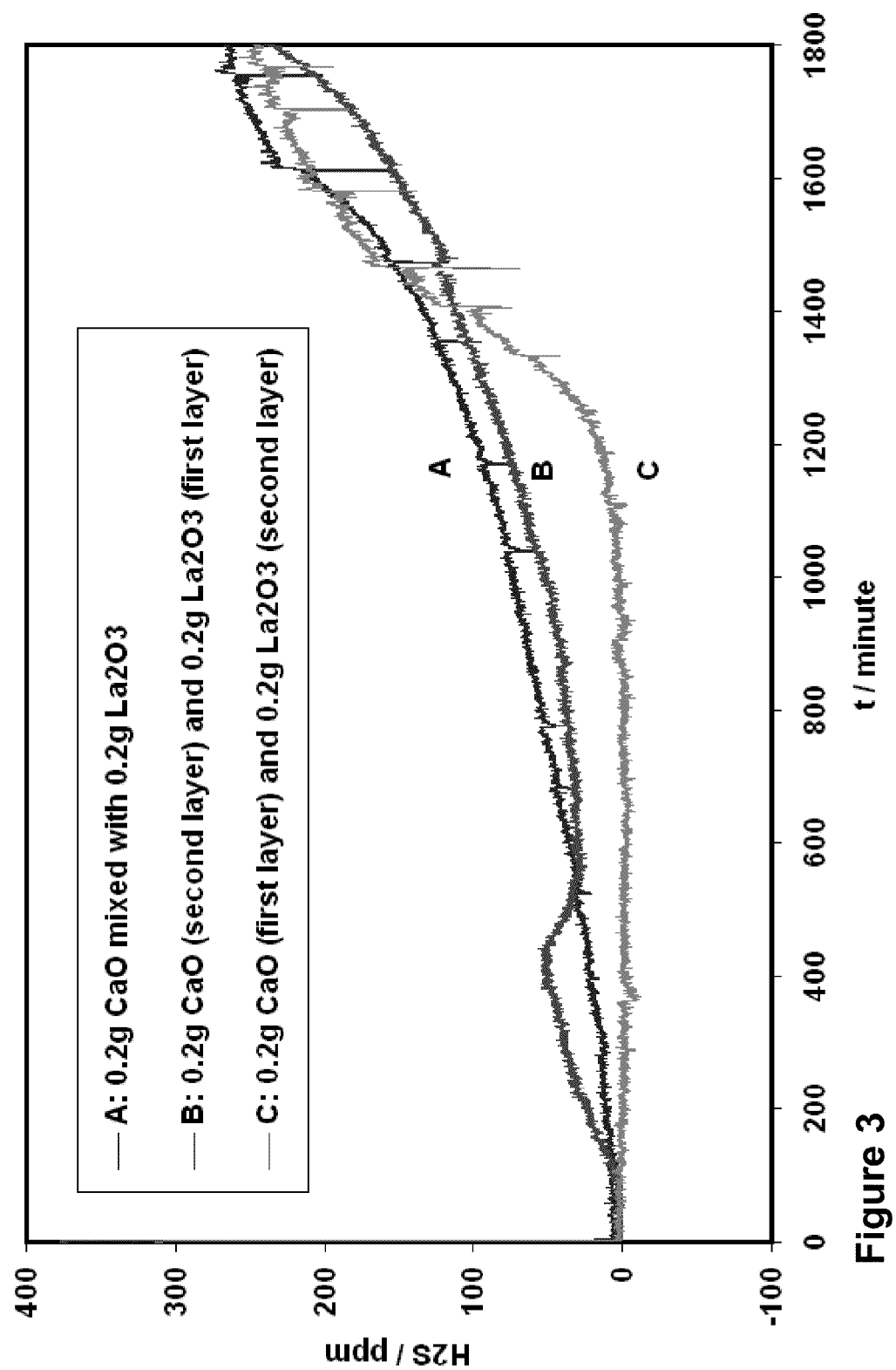
FIG. 3 graphically illustrates experimentally derived desulfurization results of the same amount of CaO (0.2 g) and $La_2O_3$ (0.2 g) combined or positioned in different ways in the assembly 10 at 600° C. where the incoming $H_2S$ was 420 ppm.

FIG. 3 graphically illustrates desulfurization results of the same amount of CaO (0.2 g) and La$_2$O$_3$ (0.2 g) combined and/or positioned in different ways in the assembly 10 at 600° C. Graphical line A correlates to the result of physically mixing CaO and La$_2$O$_3$. Graphical line B correlates to the result of positioning the CaO in the second layer and La$_2$O$_3$ in the first layer. Graphical line C correlates to the result of positioning CaO in the first layer and La$_2$O$_3$ in the second layer. Incoming gases contained 420 ppm hydrogen sulfide. The total amount of the sorbent materials in each experiment was 0.4 g.

The duration of time when the desulfurization (removal of H$_2$S) is effectively achieved correlates to zero on the y-axis as shown in FIGS. 2 and 3. When the two metal oxides (CaO and La$_2$O$_3$) with 0.2 g each were mechanically mixed together, the effective desulfurization duration was found to be less than 200 min, as shown by the graphical line A in FIG. 3. Without any mixing, but when lanthanum oxide (0.2 g) was in contact with the incoming gas stream first and calcium oxide (0.2 g) next in the assembly, the result was still less than 200 minutes, as shown by the graphical line B in FIG. 3. When the two metal oxides (CaO and La$_2$O$_3$) were placed in the assembly 10 in the manner shown in FIG. 1A, with calcium oxide as the first layer and lanthanum oxide as the second layer, the duration of effective desulfurization (where approximately zero H$_2$S/ppm remained) extended more than 1000 minutes, correlating to the graphical line C in FIG. 3.

Figure 4:
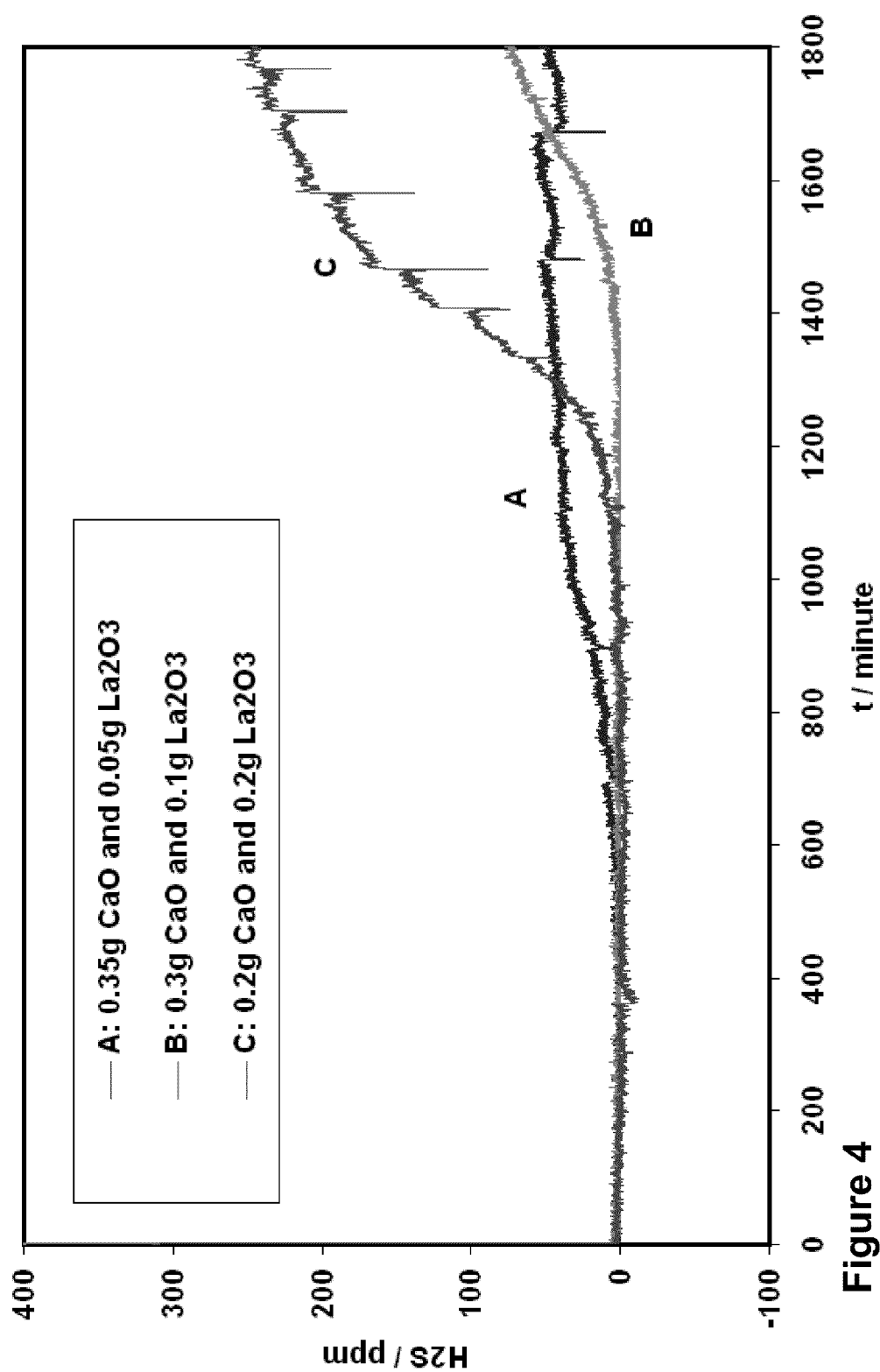
FIG. 4 graphically illustrates experimentally derived desulfurization results of CaO (first layer) and $La_2O_3$ (second layer) in the assembly 10 with different ratio of CaO to $La_2O_3$ at 600° C. Graphical line A correlating to 0.35 g CaO and 0.05 g $La_2O_3$. Graphical line B correlating to 0.3 g CaO and 0.1 g $La_2O_3$. Graphical line C correlating to 0.2 g CaO and 0.2 g $La_2O_3$.

FIG. 4 graphically illustrates the effect of changing the ratio of CaO (first layer) and $La_2O_3$ (second layer) in the assembly 10. Incoming $H_2S$ is 420 ppm. and the total amount of the sorbent materials in each case is 0.4 g.

The particular individual lanthanum oxide and calcium oxide layers provide a significantly improved desulfurization performance over either lanthanum oxide or calcium oxide used individually on the same weight basis. FIG. 4 showed the result of variation of the amount of calcium oxide and lanthanum oxide in the invented assembly. Graphical line A represents a ratio of 0.35 g. CaO in a first layer and 0.05 g $La_2O_3$ (second layer) in the assembly 10. Graphical line B represents a ratio of 0.3 g. CaO in a first layer and 0.1 g $La_2O_3$ (second layer) in the assembly 10. Graphical line C represents a ratio of 0.2 g. CaO in a first layer and 0.2 g $La_2O_3$ (second layer) in the assembly 10. The experiment demonstrated the optimal ratio is roughly around 3:1 as indicated by graphical line B.

Figure 5:
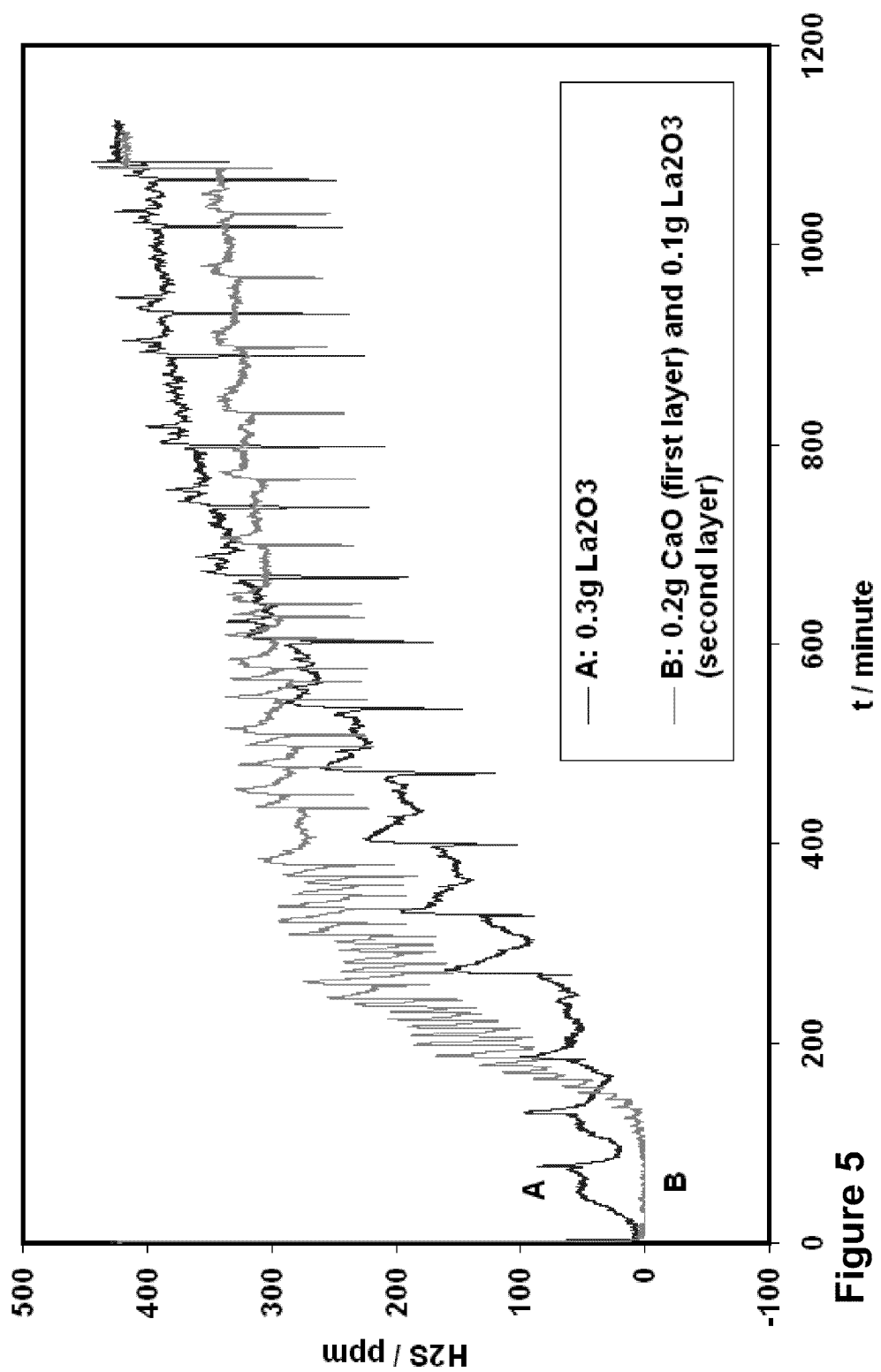
FIG. 5 illustrates experimentally derived desulfurization results at 500° C., with graphical line A correlating to the results from using 0.3 g $La_2O_3$ only, and graphical line B correlating to the results from using 0.2 g CaO (first layer) and 0.1 g $La_2O_3$ (second layer).

FIG. 5 graphically illustrates the experimental desulfurization results at 500° C., with graphical line A correlating to the results from using 0.3 g $La_2O_3$ only, and graphical line B correlating to the results from using 0.2 g CaO (first layer) and 0.1 g $La_2O_3$ (second layer) in the assembly 10 depicted in FIG. 1A. Incoming gases contained 420 ppm hydrogen sulfide. The total amount of the sorbent materials in each experiment was 0.3 g.

Figure 6:
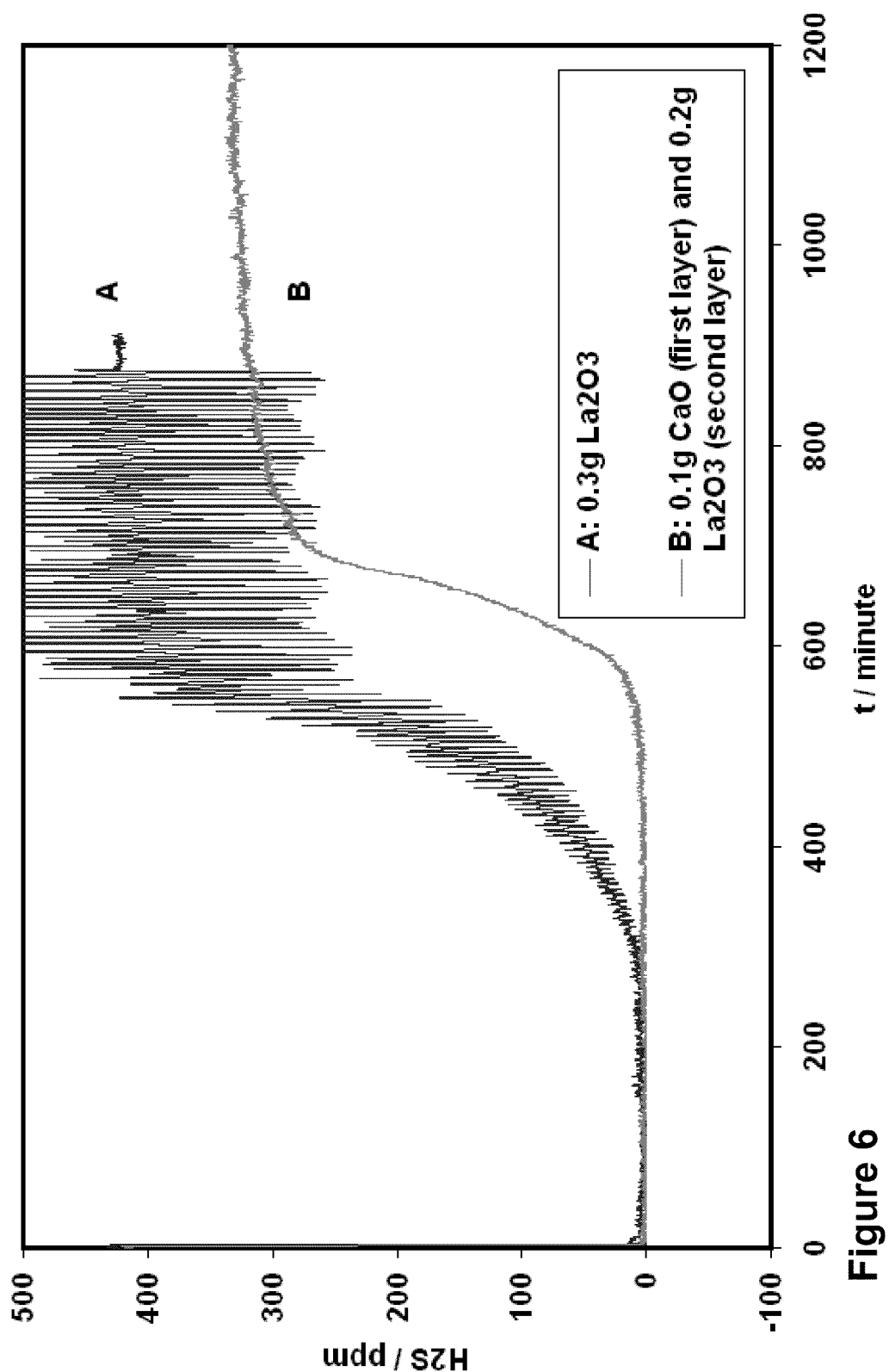
FIG. 6 graphically illustrates experimentally derived desulfurization results at 700° C. using 0.3 g $La_2O_3$ only (line A) and 0.1 g CaO (first layer) and 0.2 g $La_2O_3$ (second layer) (line B).

FIG. 6 graphically illustrates experimental desulfurization results at 700° C., utilizing 0.3 g $La_2O_3$ only (shown by graphical line A) and 0.1 g CaO (first layer) and 0.2 g $La_2O_3$ (second layer) (shown by graphical line B) in the assembly 10 depicted in FIG. 1A. Incoming gases contained 420 ppm hydrogen sulfide and the total amount of the sorbent materials in each experiment was 0.3 g.

Figure 7:
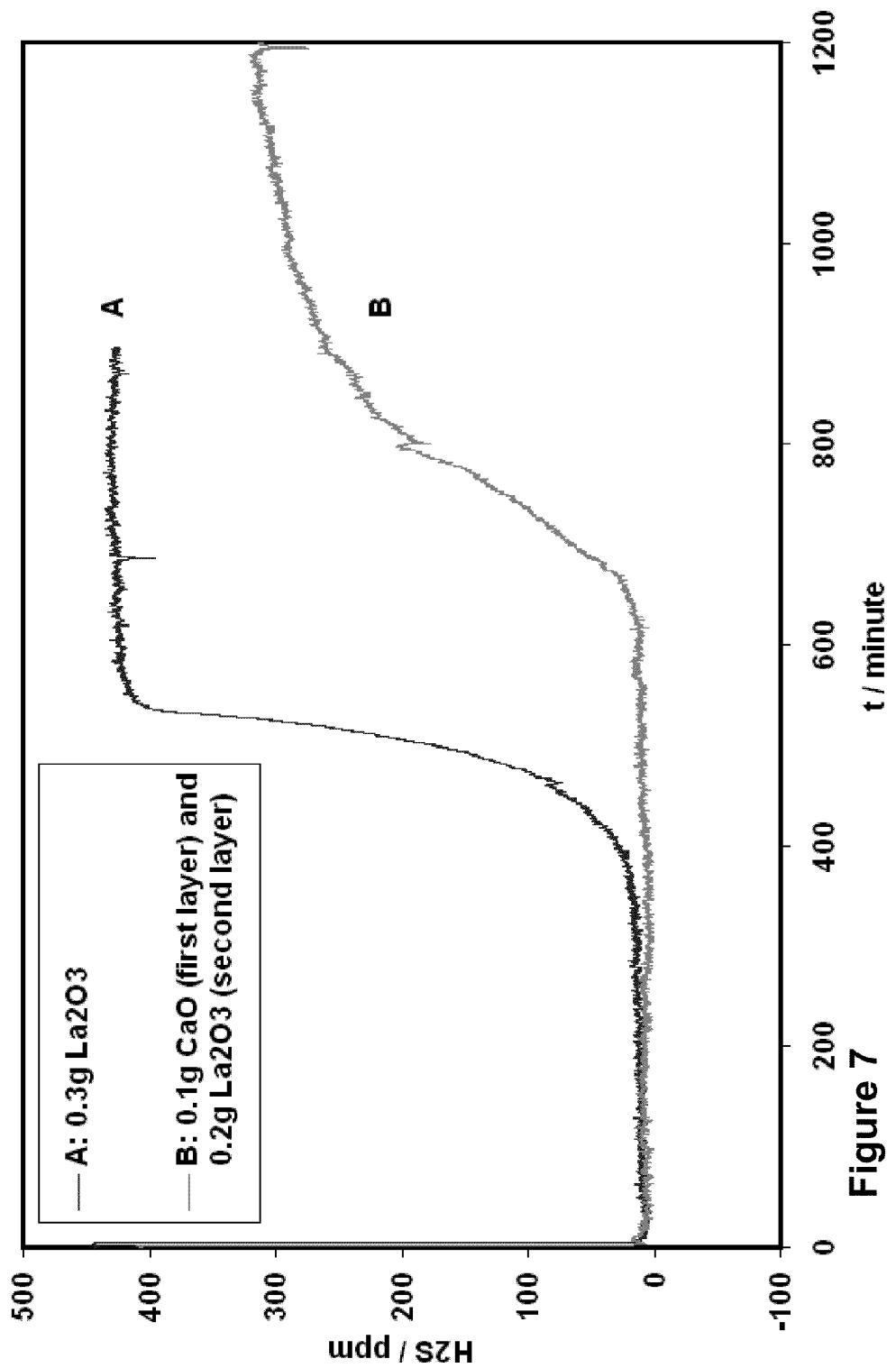
FIG. 7 graphically illustrates the experimentally derived desulfurization results at 800° C. A: 0.3 g $La_2O_3$ only; B: 0.1 g CaO (first layer) and 0.2 g $La_2O_3$ (second layer).

FIG. 7 graphically illustrates experimental desulfurization results at 800° C. using 0.3 g $La_2O_3$ only, as represented by graphical line A. The second experimental result, graphical line B, resulted from utilizing a first layer of 0.1 g CaO and a second layer of 0.2 g of $La_2O_3$ (also at 800° C.) in the assembly 10 depicted in FIG. 1A. Incoming gases contained 420 ppm hydrogen sulfide. The total amount of the sorbent materials in each experiment was 0.3 g.

Figure 8:
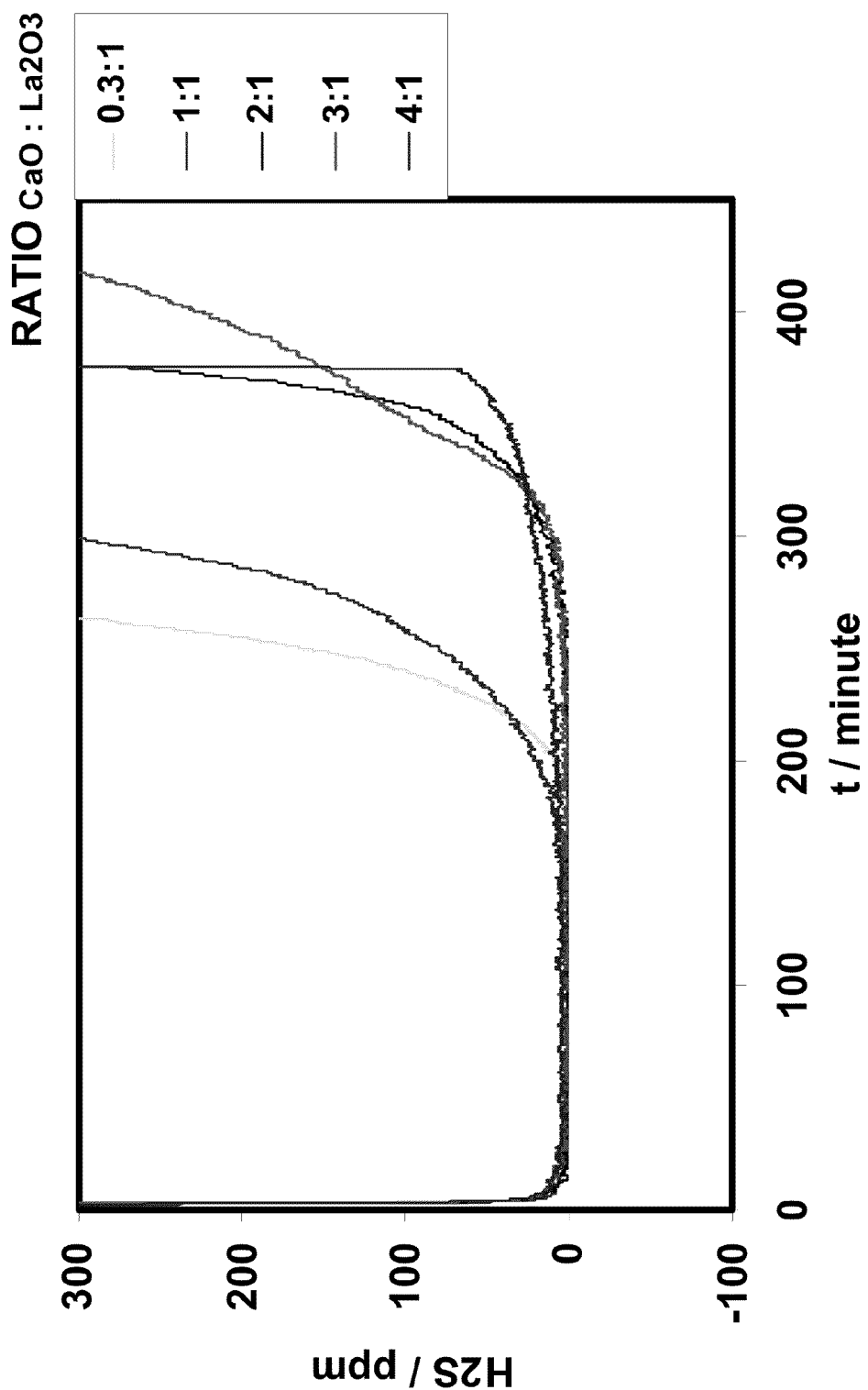
FIG. 8 is a graphical illustration depicting the experimental results obtained by varying the weight ratio of CaO to $La_2O_3$ (using a total of 0.2 gram) with incoming $H_2S$ concentration of 820 ppm at 600° C.

FIG. 8 is a graphical illustration depicting the experimental results obtained by varying the weight ratio of CaO to $La_2O_3$ at 600° C. with incoming $H_2S$ concentration of 820 ppm. In FIG. 8, the yellow line represents the experimental results using a weight ratio of 0.3 to 1 of calcium oxide to lanthanum oxide. The dark red line depicts the experimental results using a weight ratio of 1 to 1. The black line depicts the experimental results using a weight ratio of 2 to 1. The red line depicts the experimental results using a weight ratio of 3 to 1. The blue line depicts the experimental results using a weight ratio of 4 to 1. In view of the removal of substantially all of the $H_2S$ for the longest duration, the results indicate that weight ratios of 2:1 (black) and 3:1 (red) are the best, 0.3:1 (yellow) and 1:1 (brown) are next, followed by 4:1 (blue).

Figure 9:
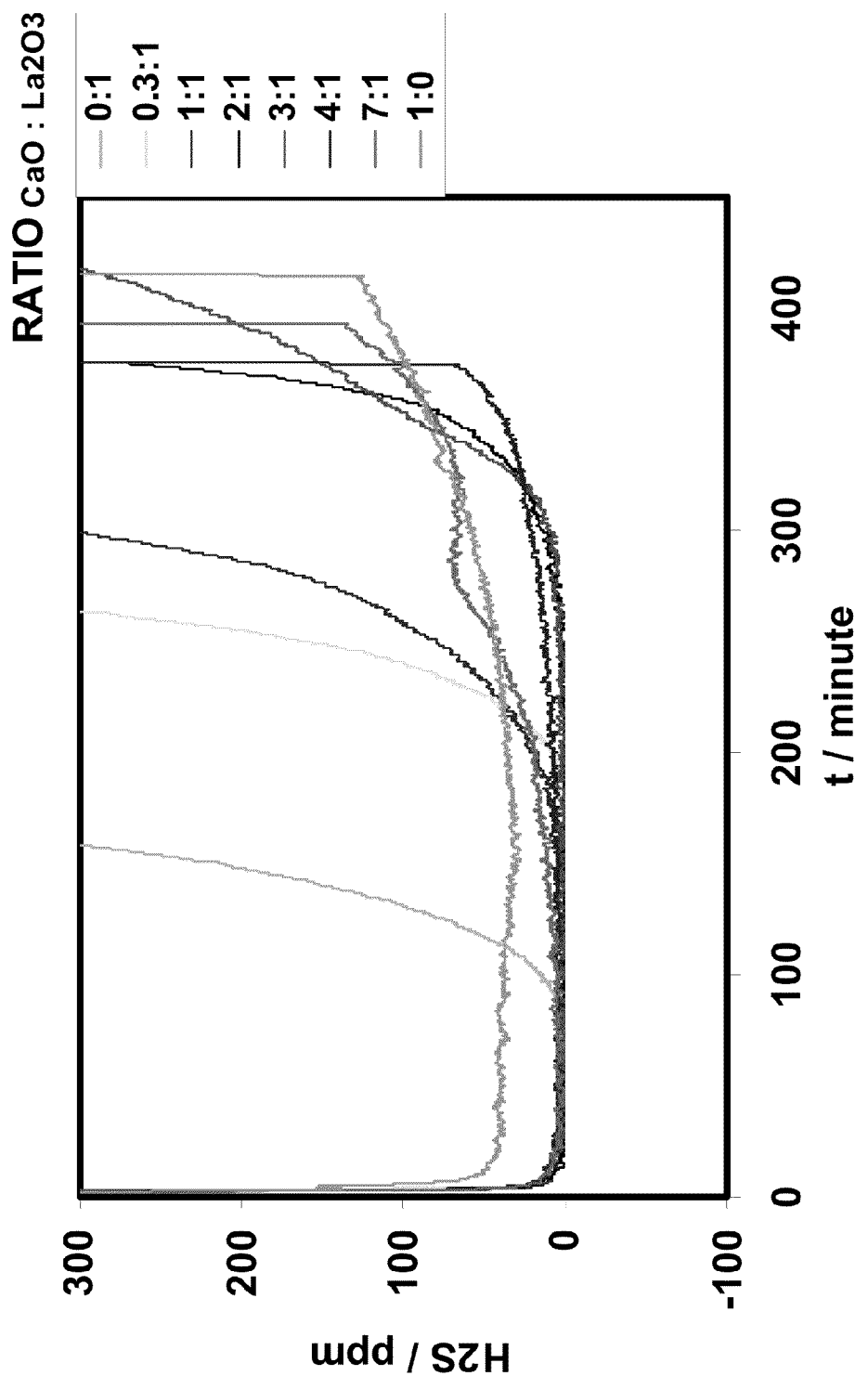
FIG. 9 is a graphical illustration depicting the experimental results obtained by varying the weight ratio of CaO to $La_2O_3$ from 1:0 to 0:1 (using a total of 0.2 gram) with incoming $H_2S$ concentration of 820 ppm at 600° C.

FIG. 9 is a graphical illustration depicting the experimental results obtained by varying the weight ratio of CaO to $La_2O_3$ from 1:0 to 0:1 at 600° C. with incoming $H_2S$ concentration of 820 ppm. In FIG. 9, the light blue line represents the experimental results using all lanthanum oxide. The yellow line represents the experimental results using a weight ratio of 0.3 to 1 of calcium oxide to lanthanum oxide. The dark red line depicts the experimental results using a weight ratio of 1 to 1. The black line depicts the experimental results using a weight ratio of 2 to 1. The red line depicts the experimental results using a weight ratio of 3 to 1. The blue line depicts the experimental results using a weight ratio of 4 to 1. The violet line depicts the experimental results using a weight ratio of 7 to 1. The green line depicts the experimental results using only calcium oxide. In view of the removal of substantially all of the $H_2S$ for the longest duration, 3:1 is the preferred weight ratio.

Unlike desulfurization process currently employed in industry, which generally removes majority of the sulfur in the fuel stream and leaves some small amount of remaining sulfur behind in the desulfurized product, the desulfurization of reformate stream for fuel cells requires that the remaining sulfur level be substantially zero or near zero (e.g. 0.0 ppm for hydrogen fuel cells and 0.1~2 ppm for solid oxide fuel cells at the present technological development stage). An additional requirement is that the desulfurization process should be carried out at temperature that is close to solid oxide fuel cells' operation temperature which is expected to be between 600-800° C. for the benefit of relatively easier component integration and thermal management. To meet the above two basic requirements, high temperature stable metal oxides with high desulfurization capacity and highly effective sulfur adsorption property are desired. As discussed in the foregoing, no single metal oxide can meet all the requirements for an extended period of time, and a combination of two metal oxides, such as calcium and lanthanum in this case, offers one solution to solve the problem. Prior art of using zinc oxide as effective sorbent works only below 500° C. under fuel reformate conditions with reducing atmosphere and in presence of water vapor.

By utilizing two metal oxides (calcium oxide and lanthanum oxide) in a desulfurization sorbent assembly in which calcium oxide is first in contact with reformate gases and subsequently in contact with lanthanum oxide (for example, along a common axis) to effectively and efficiently remove hydrogen sulfide for fuel reformation and fuel cell applications at 600-800° C., significant performance improvement is gained over using either calcium oxide or lanthanum oxide alone on the same weight basis.

The present invention of hydrogen sulfide sorbent assembly can be used in power generation by fuel cell to remove hydrogen sulfide in hydrocarbon based fuel stream. It can also be used as a hydrogen sulfide scrubber/scavenger in wide range of emission control systems.

EXAMPLE

Experiments were carried out at specified temperatures as shown in FIGS. 2 to 9 with total amount of sorbent oxide from 0.2 g to 0.4 g. The incoming fuel gas stream contained 49% H2, 29% He, 10% water, and 8% $H_2S$ containing gas cylinder (a mixture of 0.05% $H_2S$ and 99.5% Helium). The exit gases from the assembly were sent to sulfur analyzer in real time to determine the $H_2S$ level continuously. Water in the gas mixture was removed before the analyzer. The obtained desulfurization capacity of the oxides in the assembly was determined by the point where the $H_2S$ in the exit gas mixture reached to above 2 ppm, and is listed in Tables 1 and 2.

TABLE 1

| Desulfurization Capacity (mg S/g) at 600° C. | | |
|---|---|---|
| 0.3 g CaO | 0.3 g $La_2O_3$ | 0.2 g CaO (first layer) 0.1 g $La_2O_3$ (second layer) |
| 4.13 mg S/g | 41.3 mg S/g | 175 mg S/g |
| 0.3 g CaO (first layer) 0.1 g $La_2O_3$ | 0.35 g CaO (first layer) 0.05 g $La_2O_3$ | 0.2 g CaO (first layer) 0.2 g $La_2O_3$ |

TABLE 1-continued

Desulfurization Capacity (mg S/g) at 600° C.

| (second layer) | (second layer) | (second layer) |
|---|---|---|
| 185 mg S/g | 64.5 mg S/g | 129 mg S/g |

TABLE 2

Desulfurization Capacity (mg S/g) at 600, 700, and 800° C.

| | | |
|---|---|---|
| 600° C. | 0.3 g La$_2$O$_3$ | 0.2 g CaO (first layer) |
| | 41.3 mg S/g | 0.1 g La$_2$O$_3$ (second layer) |
| | | 175 mg S/g |
| 700° C. | 0.3 g La$_2$O$_3$ | 0.1 g CaO (first layer) |
| | | 0.2 g La$_2$O$_3$ (second layer) |
| | 46.4 mg S/g | 86.0 mg S/g |
| 800° C. | 0.3 g La$_2$O$_3$ | 0.1 g CaO (first layer) |
| | | 0.2 g La$_2$O$_3$ (second layer) |
| | 51.6 mg S/g | 105 mg S/g |

As used herein, the terminology "stoichiometry" is the calculation of quantitative relationships of the reactants and products in a balanced chemical reaction.

As used herein the terminology "stoichiometric capacity" relates to the quantities (for example, the amount of products) produced from the given reactants and percent yield.

As used herein the terminology "enclosure" includes a partial enclosure and includes configurations such as a cylinder, vessel, chamber, container, receptacle, or pipe.

In view of the foregoing, it is understood that numerous modifications and variations of this invention will be readily apparent to those of skill in the art. The foregoing drawings, discussion and description are illustrative of specific embodiments; but are not meant to be limitations upon the practice of this invention. It is the following claims, including equivalents, which define the scope of the invention.

The invention claimed is:

1. A method of substantially removing hydrogen sulfide from a gas at a temperature in the range of 600 to 800 degrees Centigrade comprising:
    passing the gas through a first layer of calcium oxide;
    subsequently passing the gas through a second layer of lanthanum oxide; at least one of the first and second layers being supported by a porous material.

2. The method of claim 1 wherein the gas comprises hydrogen gas and wherein the ratio by weight of calcium oxide to lanthanum oxide is in the range of 2 to 3 units of calcium oxide for each unit of lanthanum oxide, which is the optimal ratio by weight of reactants which effectively adsorbs hydrogen sulfide from the hydrogen gas in presence of water and in the temperature range of 600° C. to 800° C.

3. The method of claim 1 wherein the gas passes through a chamber with the first and second layers positioned perpendicular to the flow of gas through the chamber.

4. The method of claim 1 wherein the first layer of calcium oxide reacts with hydrogen sulfide in a temperature range of 600 to 800 degrees Centigrade; and wherein the second layer of lanthanum oxide reacts with hydrogen sulfide in a temperature range of 600 to 800 degrees, and wherein by passing the gas first through the first stage and subsequently through the second stage, substantially all of the hydrogen sulfide is removed while the weight of the first and second reactants is substantially less than the weight of reactants required when utilizing either one of the reactants alone or utilizing a mixture of the two reactants.

5. The method of claim 1 wherein the ratio by weight of calcium oxide to lanthanum oxide is within a range of 2 to 3 units of calcium oxide for each unit of lanthanum oxide.

6. The method of claim 5 wherein the calcium oxide removes a predominant amount of hydrogen sulfide and the lanthanum oxide substantially removes the remainder of the hydrogen sulfide from the gas.

7. A desulfurization assembly for removing hydrogen sulfide from a gas while utilizing a minimal amount of reactants by weight comprising two stages:
    a first stage comprising a first reactant which reacts with hydrogen sulfide at a temperature in the range of 600 to 800 degrees Centigrade in which the stoichiometrical capacity of the first reactant is approximately 571 mg per gram of sulfur or greater;
    a second stage comprising a second reactant which reacts with hydrogen sulfide at a temperature in the range of 600 to 800 degrees Centigrade, the second reactant operating to react with the hydrogen sulfide more favorably than the first reactant but having a stoichometrical capacity which is less than the first reactant;
    wherein by passing the gas first through the first stage and subsequently through the second stage substantially removes all of the hydrogen sulfide while the weight of the first and second reactants is substantially less than the weight of reactants required when utilizing either one of the reactants alone or utilizing a mixture of the two reactants.

8. The assembly of claim 7 wherein the first reactant is calcium oxide and the second reactant is lanthanum oxide.

9. The assembly of claim 7 wherein the reaction in the first stage is

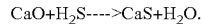

$CaO+H_2S\longrightarrow CaS+H_2O.$

10. The assembly of claim 7 wherein the reaction in the second stage is $La_2O_3+H_2S\longrightarrow La_2O_2S+H_2O$ and wherein the assembly comprises a walled enclosure having at least one inlet and at least one exhaust for the passage of gas to be filtered by the assembly.

11. The assembly of claim 7 wherein the weight ratio of the first reactant to the second reactant is in the range of 2 to 3 units of the first reactant for each unit of the second reactant.

* * * * *